United States Patent [19]
Lim

[11] Patent Number: 5,919,083
[45] Date of Patent: Jul. 6, 1999

[54] CENTERING TEMPLATE FOR CONCENTRIC GRINDING

[75] Inventor: John C. Lim, Claremont, Calif.

[73] Assignee: Rexor Corporation, Ontario, Calif.

[21] Appl. No.: 08/893,998

[22] Filed: Jul. 17, 1997

[51] Int. Cl.$^6$ .................................................. B23B 33/00
[52] U.S. Cl. ...................... 451/237; 451/365; 451/398; 451/439; 279/133; 82/170
[58] Field of Search .................................. 451/439, 237, 451/44, 365, 398; 279/133; 82/170

[56] References Cited

U.S. PATENT DOCUMENTS

| | | | |
|---|---|---|---|
| 3,099,173 | 7/1963 | Palawsky et al. | 82/170 |
| 3,307,251 | 3/1967 | Magyar | 82/170 |
| 4,702,132 | 10/1987 | Grosse | 82/165 |

Primary Examiner—David A. Scherbel
Assistant Examiner—Shantese McDonald

[57] ABSTRACT

There is disclosed a self-centering template useful for centering cylindrical bodies on their axes in rotating machines such as a concentric grinder. The centering templates of the invention are generically cup-shaped plates, having an end disc with a dependent, preferably integral, cylindrical wall. The disc has a central aperture which is intersected by a radial slot extending from the periphery of the disc. The inside surface of the annular wall is tapered from a maximum thickness adjacent the disc. In use, templates are placed over the opposite ends of a cropped silicon ingot and the resultant assembly is mounted in the concentric grinding machine, with the central aperture of the template disc guiding the head stock and tail stock chuck into centric engagement with the ends of the ingot. After the ingot is clamped in the machine, the templates are removed by passing the radial slots of the templates past the machine shafts.

10 Claims, 4 Drawing Sheets

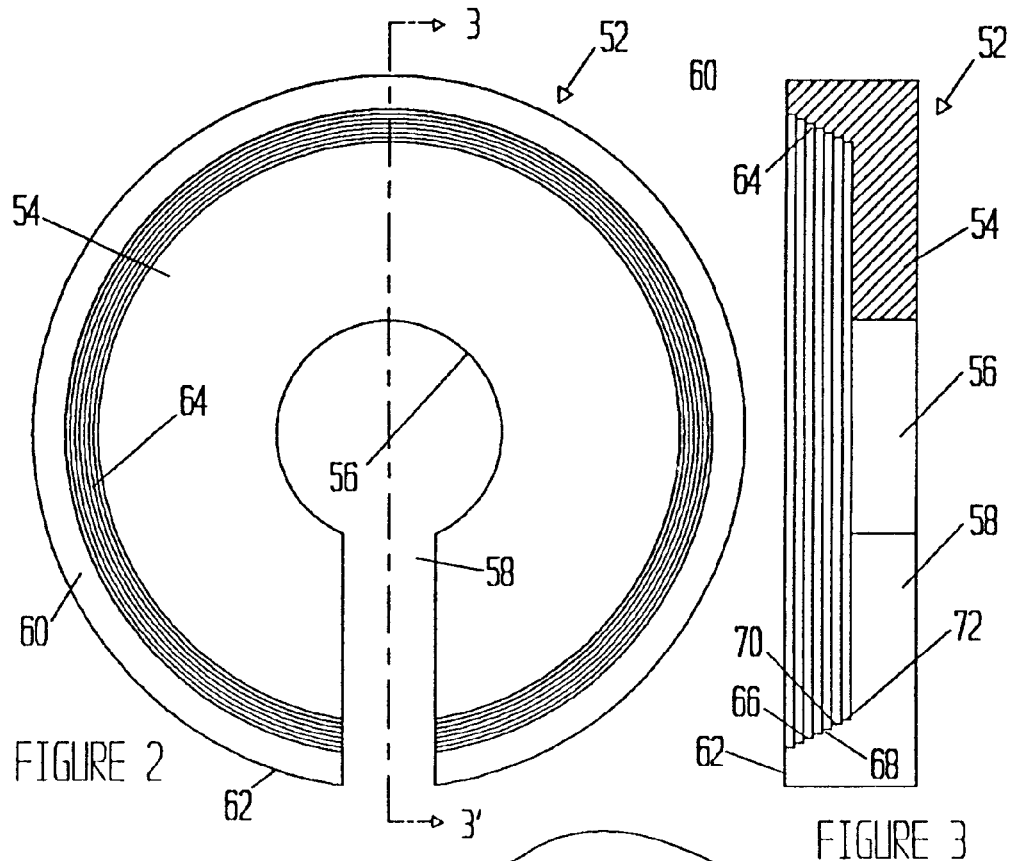
FIGURE 2
FIGURE 3
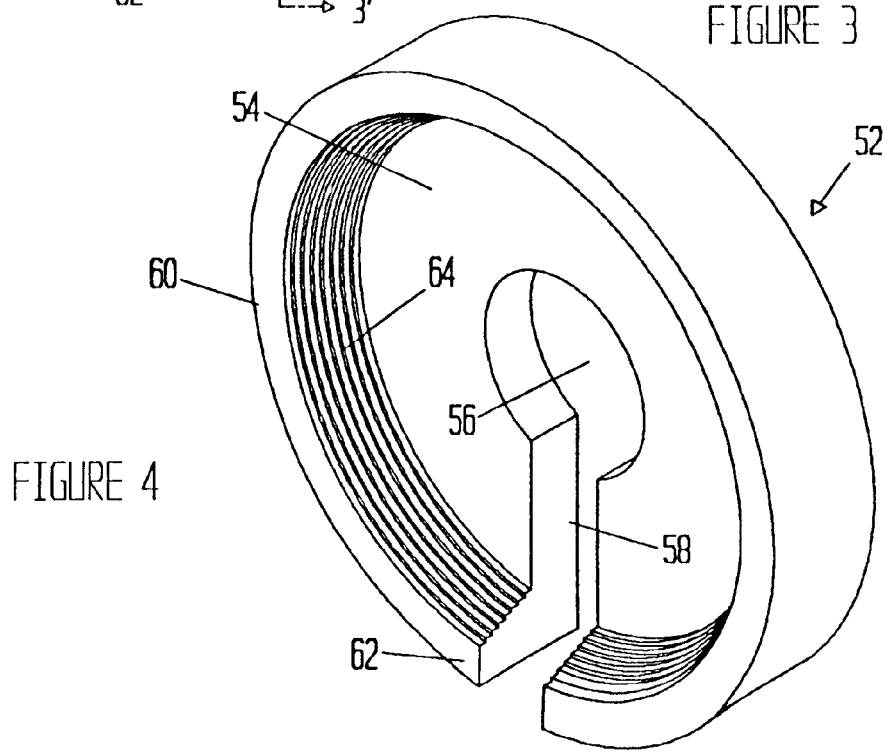
FIGURE 4

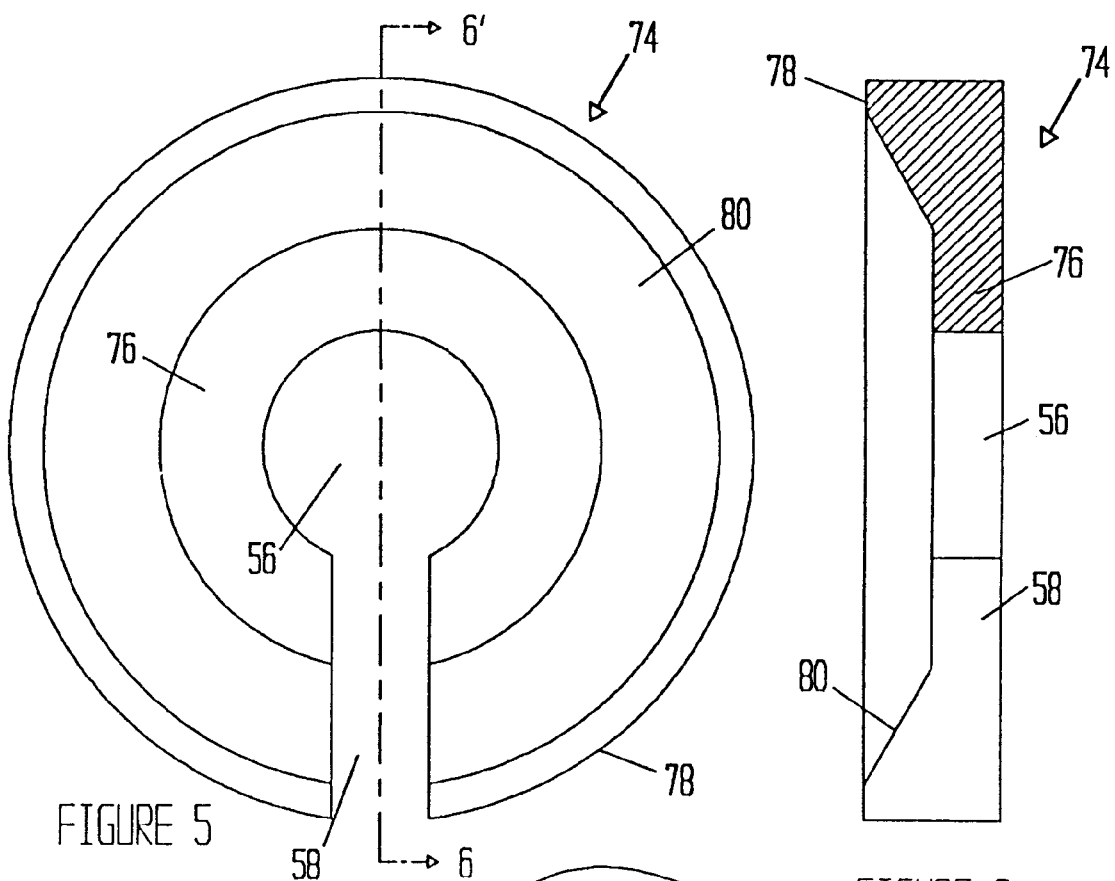
FIGURE 5
FIGURE 6
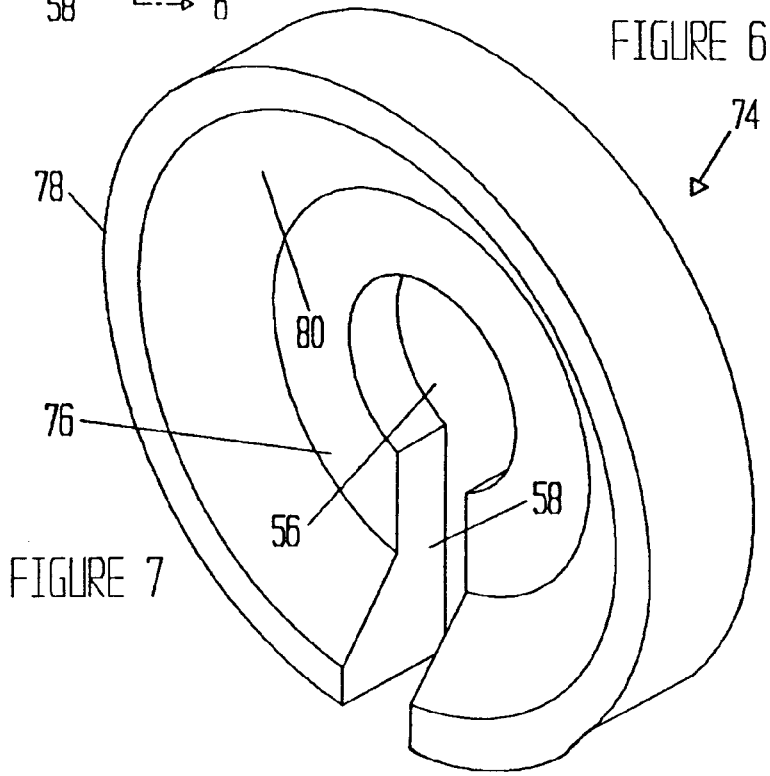
FIGURE 7

5,919,083

CENTERING TEMPLATE FOR CONCENTRIC GRINDING

BACKGROUND OF THE INVENTION

1. Field of the Invention

This invention relates to a centering template and in particular to a centering template useful for aligning cylindrical bodies in a concentric grinding machine, such as outer diameter grinders.

2. Brief Description of the Prior Art

Silicon ingots of single crystal structure of high purity are produced in various furnaces such in the Czochralski process. The resulting boule, or ingot, is generally cylindrical in shape but has an irregular diameter and must be concentrically ground to a given diameter.

Usually, the silicon ingot is clamped between chucks on the head stock and tail stock of the machine, and rotated while pressing the rapidly rotating grinding wheel against the ingot for grinding.

However, the lack of precision in positioning ingot in the machine frequently results in improper ingot. In order to alleviate this defective process, manual centering, and gluing the ingot to the head and tail stock chucks are practiced. This method is not only uneconomical, time consuming but also imprecise.

OBJECTIVES OF THE INVENTION

It is an objective of this invention to provide a self-centering template useful for positioning cylindrical objects in a grinding machine.

It is a further objective of this invention to provide a self-centering template useful for aligning silicon ingots in concentric grinding machines.

It is an additional objective of this invention to provide self-centering templates which can be readily removed from the concentric grinding machine after the silicon ingot has been aligned and mounted in the machine.

It is an additional objective of this invention to avoid the use of glue to affix head and tail stock chucks to the ends of the silicon ingot.

It is likewise an objective of this invention to improve the efficiency and the retrieval process of single crystal silicon ingots from a concentric grinding operation.

Other and related objectives will be apparent from the following description of the invention.

BRIEF STATEMENT OF THE INVENTION

This invention comprises a self-centering template useful for centering cylindrical bodies on their axes in rotating machines such as a concentric grinder. The centering template of the invention is generically a cup-shaped plate, with an annular disc and a dependent, preferably integral, cylindrical wall. The disc has a central aperture which is intersected by a radial slot extending from the periphery of the disc. The inside surface of the annular wall is tapered from a maximum thickness adjacent the disc. In use, the self-centering templates are placed over the opposite ends of a cropped silicon ingot and the resultant assembly is mounted in the concentric grinding machine, with the central aperture of the template disc guiding the head stock and tail stock chucks into centric engagement with the ends of the ingot. After the ingot is clamped in the machine, the templates are removed by passing the radial slots of the templates past the machine shafts.

BRIEF DESCRIPTION OF THE DRAWINGS

The invention will be described with reference to the figures of which:

FIGS. 2–4 illustrate one embodiment of the self-centering template of the invention;

FIGS. 5–7 illustrate another embodiment of the self-centering template useful in the invention.

DESCRIPTION OF THE PREFERRED EMBODIMENT

Figure 1:
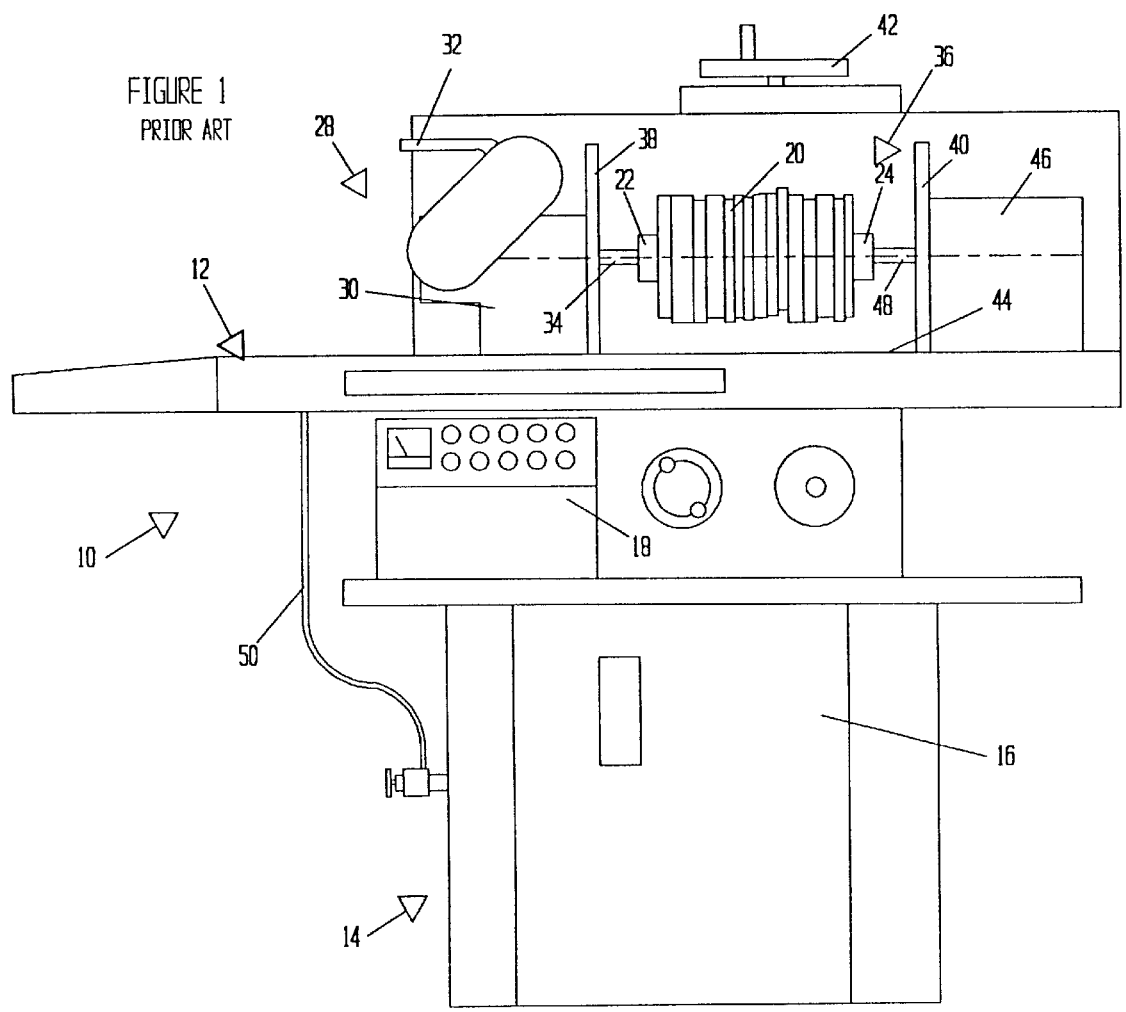
FIG. 1 illustrates the prior art concentric grinding machine used for finishing of crude silicon ingots.

Referring to FIG. 1, there is illustrated a concentric grinding machine, 10, which is used to process crude silicon ingots into precision ground, right cylindrical silicon ingots useful for preparation of integrated circuit preforms.

The silicon ingot, 20, is clamped between a head stock chuck, 22, and a tail stock chuck, 24, of the grinding machine, 10. The surface irregularities of the ingot are exaggerated in the drawings for illustration purposes.

The head stock, 26, has a power source, 28, such as an electric motor, 30, which receives electrical power through a supply conduit, 32. The motor shaft, 34, extends into the grinding chamber, 36, which is formed by vertical end plates, 38 and 40. The ingot, 20, placed between the head stock chuck, 22, and tail stock chuck 24, is ground to a given diameter by adjusting grinding wheel, 21, behind the ingot, 20. The grinding machine also has a tail stock, 46, with tail stock shaft, 48 and a tail stock chuck, 24, which can also be advanced into the grinding chamber to compressively engage the silicon ingot, 20. The machine includes supply lines 50, for the circulation of a cooling fluid, water, across the grinding surface.

As previously mentioned, a problem frequently encountered with the conventional prior art concentric grinding is the difficulty in positioning the irregularly surfaced silicon ingot on its axis to the centerline of the grinder. Such positioning is currently accomplished manually by visual estimate of the ingot, a practice that frequently leads to non-concentric removal of silicon from the ingot, reducing the efficiency and recovery of the ground ingot.

Referring now to FIGS. 2–4, there is illustrated a self-centering template. 52, useful in this invention. The template has a general cup shape, with an annular end disc, 54, having a central aperture, 56, that is sized slightly larger than the outside diameter of the chucks 22 and 24 on the head stock shaft 46, and tail stock shaft, 48 of the grinding machine, 10. The end disc, 54, also has a radial slot, 58, extending from its periphery into intersection with the central aperture, 56, similar to a keyhole slot. The width of the radial slot, 56, is slightly larger than the diameter of the head stock and tail stock shafts, 46 and 48, of the grinding machine, 10, as described in greater detail hereinafter.

The centering template, 52, has a cylindrical wall, 60, which is integral with and dependent from disc, 54. The wall is tapered in thickness, with its maximum thickness adjacent the surface of the end disc, 54 and its minimal thickness at its outer edge, 62.

In the embodiment shown in FIGS. 2–4, the inside surface, 64, of the cylindrical wall, 60, is stepped with a plurality of successive and incrementally decreasing diameters, forming shoulders such as 66, 68, 70 and 72.

Referring now to FIGS. 5–7, another embodiment of the invention is illustrated. As there illustrated, the self-centering template, 74, has an annular end disc, 76, having a central aperture, 56 and a radial slot, 58, all as previously described for the embodiment as shown in FIGS. 2–4. The template, 74, shown in FIGS. 5–7, however, has a cylindrical wall, 78, with a beveled or conical inside surface, 80, rather than the incrementally stepped surface, 64, shown in FIGS. 2–4.

Figure 8:
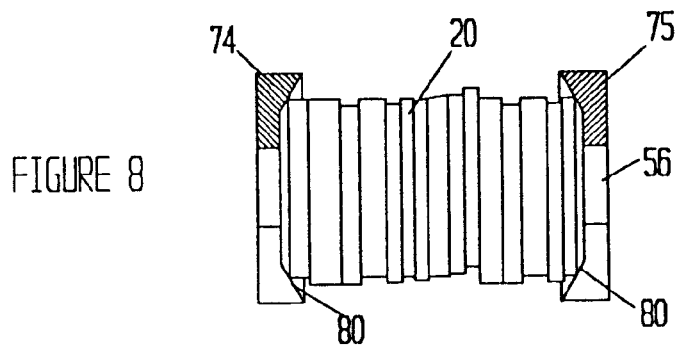
FIGS. 8–11 illustrate the steps in the use of the self-centering template of the invention.

Referring now to FIG. 8, the use of the self-centering template will be described. As there illustrated, the silicon ingot, 20, with irregular diameters, is end-capped with self-centering templates, 74 and 75, perpendicular to the centering axis of the ingot. In FIG. 8, the self-centering templates are shown in sectional view similar to the view shown in FIG. 6. The tapered inside surface, 80, of the cylindrical wall of each template adjusts to the varied diameter of the ends of the silicon ingot, 20, and the templates, 74 and 75 are thereby orientated on the centerline of the ingot, 20, that will achieve an optimum recovery in the grinding operation.

Figure 9:
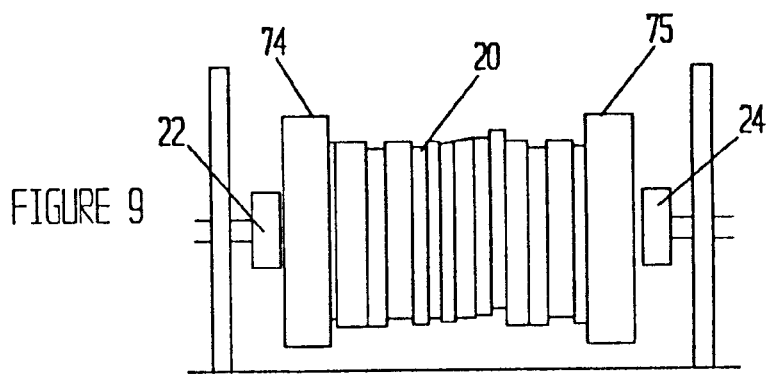

The assembly of the self-centering template, 74 and 75, and the silicon ingot, 20, is then placed on the concentric grinding machine in the manner illustrated in FIG. 9. As there illustrated, the head stock chuck, 22 and tail stock chuck, 24, have been retracted sufficiently to permit insertion of the assembly of the ingot, 20, and self-centering templates, 74, and 75 into a grinding machine, such as that shown in FIG. 1.

Figure 10:
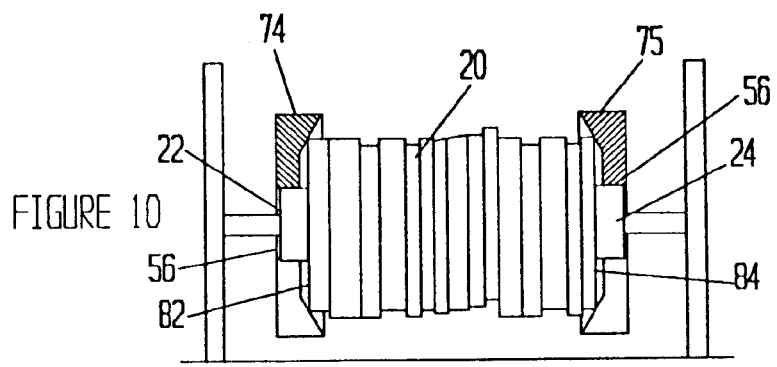

After the assembly is placed on the grinding machine, the head stock shaft, 34 and tail stock shaft, 48, are advanced into the grinding chamber until the head and tail stock chucks, 22 and 24, compressively engage end surfaces, 82 and 84, of the silicon ingot, 20 in the manner shown in FIG. 10. The head stock and tail stock chucks, 22 and 24, are passed through the central aperture, 56 of the self-centering templates, 74 and 75. The close fit of the chucks in the central apertures 56 of the templates, 74 and 75 insures that the axis of the ingot is aligned on the axis of the machine.

Figure 11:
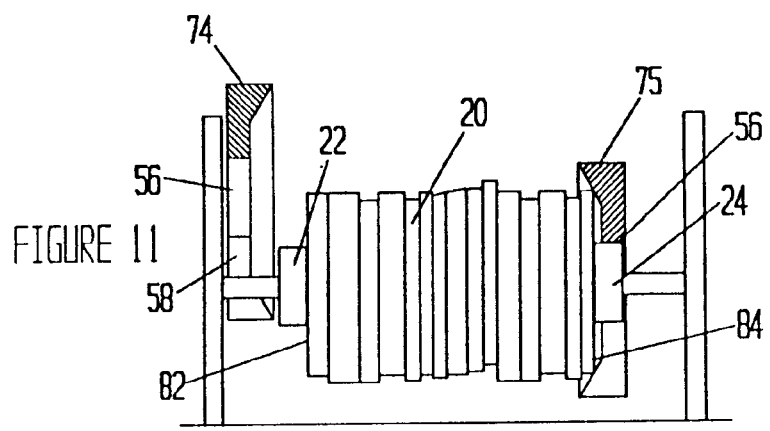

Once the ingot, 20, is firmly secured in the concentric grinding machine, the self-centering templates, 74 and 75, are removed in the manner illustrated in FIG. 11 by moving the templates axially to clear the chucks of the grinding machine and then lifting the templates out of the machine by passing the radial slot, 58, over the shafts of the grinding machine as shown for the left template, 74. Once the templates are removed, the grinding machine can be used in the conventional manner for the precision grinding of the silicon ingot into cylindrical suitable for slicing to obtain circular silicon wafers useful as integrated circuit preforms.

The self-centering templates of the invention are used without any modification or alteration of the concentric grinding machine and do not interfere or interrupt the normal operation of that machine. Nevertheless, the templates of the invention are useful to obtain a precise alignment of a silicon ingots of irregular diameters in the concentric grinding machine at an optimum position on its centerline which will achieve maximum recovery of a cylindrical body from the grinding operation, is useful for slicing to obtain integrated circuit preforms.

The self-centering templates of the invention greatly minimize waste and increase the efficiency of the grinding operation. The templates are easy to use and require no special training whereby experienced machine operators readily adopt the templates to the grinding operation.

This invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a concentric grinding tool having a bed, head stock and tail stock and head stock and tail stock shafts with end chucks, a generally cylindrical work-piece supported in said tool between said end chucks and including a compression mechanism for compressively clamping said end chucks against the opposite ends of said work-piece, the grinding tool also including a powered drive connected to the head stock shaft for rotation of said work-piece and a planar abrasive grinding wheel, the improvement comprising:

a pair of centering templates, one each positioned on opposite ends of said work-piece, the templates having a cylindrical wall and circular end face with a center aperture for seating over the said end chucks on said head and tail stock shafts and a radial slot having a width no less than the diameter of said shafts and extending from the periphery of said template to the center aperture, with the cylindrical wall being tapered in thickness with its maximum thickness adjacent to the circular end face of the template.

2. The concentric grinding tool of claim 1 wherein the inside wall of template is stepped in a plurality of successive internal diameters with the minimum internal diameter adjacent to the end face of said circular end face.

3. The concentric grinding tool of claim 1 wherein said successive internal diameters range from 50 millimeters to 300 millimeters.

4. The concentric grinding tool of claim 1 wherein the inside wall of said adapter is beveled.

5. A self-centered template to position a cylindrical object which comprises:

a cup-shaped plate having an end disc with a central aperture, an integral cylindrical peripheral wall, a radial slot extending from the periphery of said disc into intersection with said central aperture, with said cylindrical wall being tapered in thickness with its maximum thickness adjacent said end disc.

6. The combination of the self-centering template of claim 5 and a concentric grinding tool having a bed, head stock and tail stock and head stock and tail stock shafts with end chucks, a generally cylindrical work-piece supported in said tool between said end chucks and including a compression mechanism for compressively clamping said end chucks against the opposite ends of said work-piece, the grinding tool also including a powered drive connected to the head stock shaft for rotation of said work-piece and a planar abrasive grinding surface.

7. The combination of claim 6 wherein said central aperture of said template has a diameter slightly greater than the diameter of said end chucks to permit said template to be placed over said end chucks.

8. The combination of claim 7 wherein said radial slot has a width no less than the diameter of said shafts to permit said template to be removed from said tool by passing over said shafts.

9. The combination of claim 6 wherein the inside wall of said template is stepped in plurality of successive internal diameters with the minimum diameter adjacent the end disc of the template.

10. The combination of claim 6 wherein the inside wall of said template is beveled.

* * * * *